Dec. 3, 1940.  W. P. TORRINGTON  2,223,501
YEAST TREATING METHOD
Filed Oct. 7, 1939
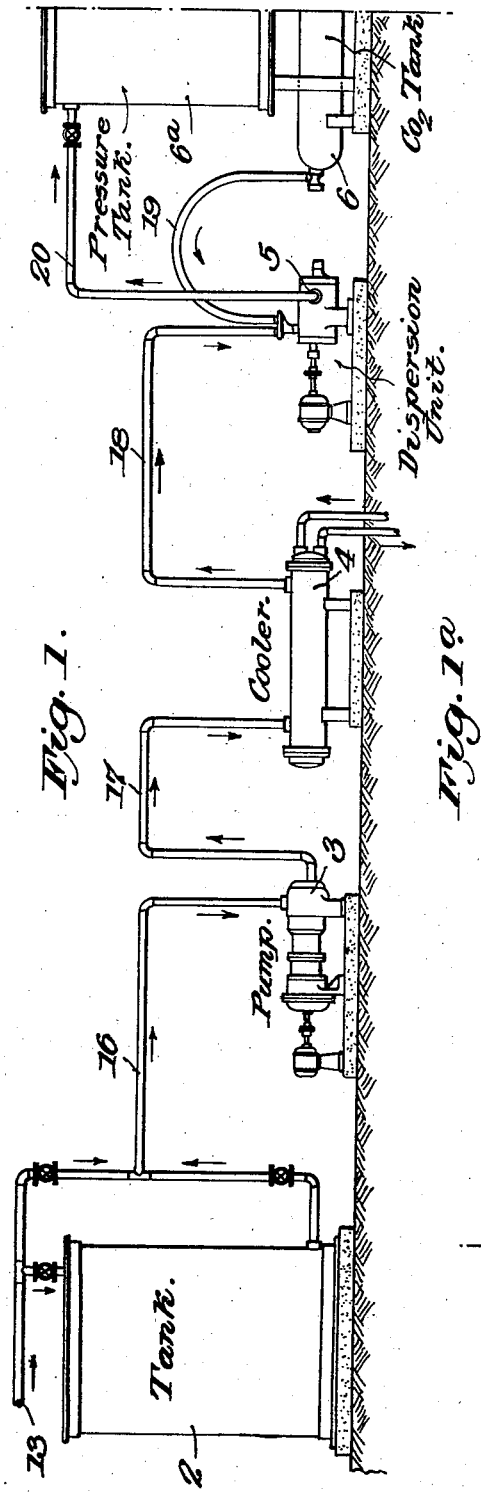
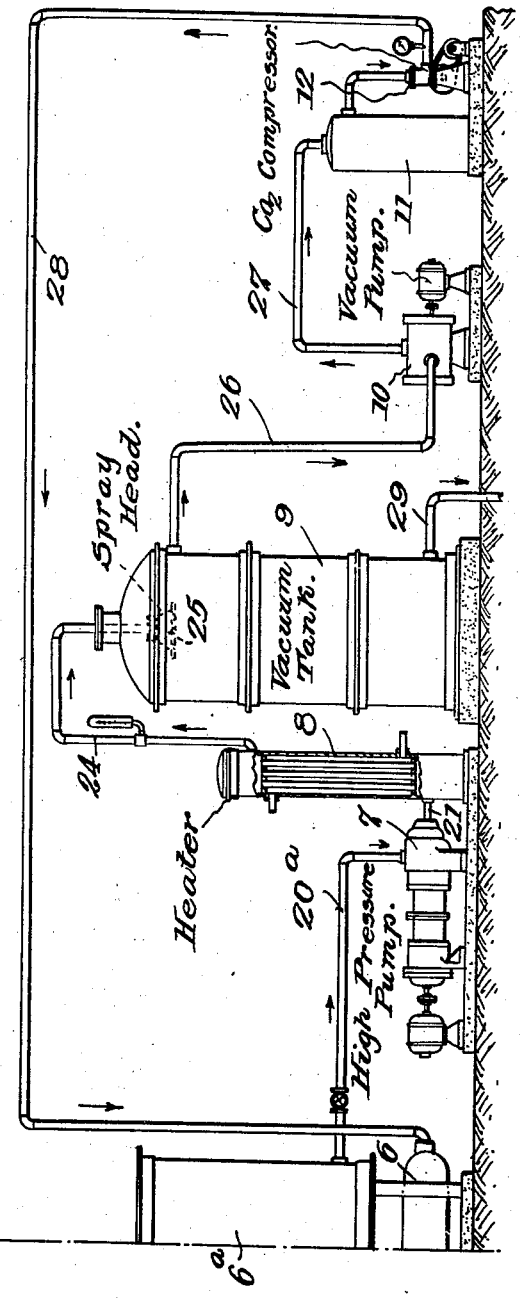
Inventor
W. P. Torrington,
By Seymour, Bright & Nottingham
Attorneys Patented Dec. 3, 1940

2,223,501

UNITED STATES PATENT OFFICE 2,223,501

YEAST TREATING METHOD

William P. Torrington, New York, N. Y., assignor to Emulsions Process Corporation, New York N. Y., a corporation of Delaware Application October 7, 1939, Serial No. 298,455

15 Claims. (Cl. 195—68)

This invention relates to the treatment of yeast and more particularly to improvements in the invention disclosed in my application Serial No. 273,078, filed May 11, 1939 (now Patent No. 2,190,689, dated February 20, 1940). In said application I have disclosed a novel method and apparatus of breaking down yeast cells to release the enzymes contained therein. So far as I am aware, the methods there and here disclosed are the only practical ones for preparing yeast material from which the vitamins can be extracted in their active state, because no destructive temperatures or chemical re-agents are employed. There are many processes of cooking yeast and making extracts or treating with chemicals, such as acids, in order to obtain vitamin concentrates, but as some of the vitamins are destroyed by the use of heat or chemicals, it is important that such treatments be avoided in order to secure the full benefit of the vitamins in their natural state, unaltered and combined in their relation to each other as they are in the yeast.

My methods produce products capable of concentration by low temperature evaporation or spray drying to obtain whole yeast containing vitamins and enzymes in an unaltered condition without having any live cells present for reproduction. This is essential because it permits the feeding of the human system with a product which will not cause further growth of the yeast within the digestive tract. It is also important because malt beverages, for example, can be reinforced with such vitamin extracts without causing any further fermentation due to the absence of active yeast cells.

In my prior application I have disclosed a method in which an aqueous solution of active yeast is subjected to carbonation by dispersing within the same a gas, such as $CO_2$ that will provide an acid reaction in connection with water and that has a relatively high solubility, so that an excess of gas is present in the solution. Subsequently, the solution is subjected to high superatmospheric pressure and to an increasing temperature before the pressure is suddenly released to effect expansion of the gas and rupturing of the yeast cells.

The primary purpose of the present invention is to furnish an improved method and apparatus of treating yeast cells so as to alter their permeability or destroy the cell membrane, thereby making available the vitamin B complexes contained within the cells.

A further object is to provide a method by which concentrated crude extracts of vitamin B complexes may be cheaply manufactured, and which can be used as a raw material for the manufacture of pure concentrates or as a cheap source of such complexes, having the advantage that the B complexes can be taken orally without the unpleasant taste and bulk present when untreated yeast is consumed.

Further work along the line of my original invention has developed several factors of importance. In the first place, I have found that the length of time that the yeast is in contact with $CO_2$ or its equivalent is essential. Apparently by maintaining the yeast in contact with the gas under pressure for an extended period of time, carbonic acid is formed proportionately to the temperature and pressure under which the yeast is held. As a result of the acid condition present, through proper control of these factors, a certain amount of acid hydrolysis of the yeast cell takes place, with the resulting swelling of the colloidal material within the yeast cell thereby effectively charging the cell with $CO_2$ at the pressure and temperature at which the solution is stored.

While my improved method may be practiced with various types of apparatus, I have devised a special apparatus for my purpose, which is illustrated in the accompanying drawing, in which Fig. 1 is a side elevation of the first portion of the apparatus.

Fig. 1a is a similar view of the second portion of the apparatus with a part in section to facilitate illustration.

Referring to the drawing, 2 designates a tank, 3 a pump, 4 a cooler, 5 a dispersion unit or emulsifying mill, 6 a storage tank for $CO_2$ or its equivalent, 6a a pressure storage tank, 7 a high pressure pump, 8 a tubular type heater, 9 a vacuum tank, 10 a vacuum pump, 11 a second tank for $CO_2$ or the like, and 12 a compressor.

The aqueous solution of yeast to be treated is introduced into the tank 2 through the pipe 13 or such solution may be introduced directly into the pipe 16 which conveys the same to the pump 3. The latter puts the solution under superatmospheric pressure, say about 150 pounds per square inch, before forcing it through a pipe 17 into the cooler 4 which its temperature is reduced to about 0° C., for example.

From the cooler, the solution is conducted by a pipe 18 to the dispersion mill 5, which is preferably of the type disclosed in the patent to M. W. Ditto, No. 2,169,339, dated August 15, 1939. As it enters the dispersion unit, it is mixed with $CO_2$ or its equivalent, which is passed from the tank 6 to the inlet of the dispersion mill by means of a pipe 19. In the mill, the $CO_2$ or the like is finely dispersed in the aqueous yeast solution, and the mixture is discharged through a pipe 20 that conveys the same to the pressure tank 6a in which it is maintained for a prolonged period of time under such superatmospheric pressure and temperature, say for a number of hours. After the desired period of storage, the mixture is withdrawn from the tank 6a through the line 20a to the high pressure pump 7 which raises the pressure on the mixture to a pressure ranging, for example, between 20 and 70 atmospheres, before the mixture travels through a pipe 21 into one end of the tubular heater 8. In passing through the heater, the temperature of the mixture is raised to the order of approximately 30° C. to 49° C., for example.

After heating, the mixture travels through a pipe 24 terminating in a spray head 25 arranged in the vacuum tank 9. As the interior of such tank is maintained under subatmospheric pressure, the $CO_2$ or its equivalent will be released from the mixture and will be withdrawn by the vacuum pump 10 through a pipe 26 which forces such gas through a pipe 27 into the tank 11. It is withdrawn from the latter by means of the compressor 12 which places it under a pressure in excess of that used in the dispersion unit 5 so that it may be returned to the tank 6 through the pipe 28 and be passed from the tank 6 into the dispersion unit.

From the tank 9 the treated yeast solution may be withdrawn through a pipe 29 and passed to filters, evaporators, spray dryers, etc.

In one method of operation, I take an aqueous solution of brewer's yeast and disperse $CO_2$ within the same before placing the mixture in the tank 6a and maintaining the mixture in that tank under proper conditions of time, temperature and pressure before increasing the pressure on the mixture, raising its temperature and then spraying the same into the vacuum chamber 9.

Tests have shown that storage of the carbonated yeast solution in the tank 6a under a pressure of approximately ten atmospheres at 0° C. gives satisfactory results over a time period of from 48 to 72 hours.

After such storage the solution was pumped through the heating coil 8 in which its temperature was raised to approximately 30° C. to 49° C. and then sprayed through the nozzle 25 at a pressure of from 20 to 70 atmospheres, into the chamber 9 maintained under from 12 to 20 inches of vacuum.

The combination of absorption of the acid solution through the semi-permeable membrane of the yeast cell by the colloidal plasm complex of the cell, as a result of the pressure and time period, followed by increasing the pressure and heating, to put the $CO_2$ in a gaseous state under the pressure at which it is sprayed through the nozzle, resulted in an extremely violent expansion of the $CO_2$ in the vacuum chamber. The $CO_2$ contained within the cell cannot be diffused through the membrane slowly as it entered as a weak acid solution, therefore, disintegration of the cell wall occurred in some instances and altering of the cell wall to the extent that its permeability is destroyed, occurred in approximately 95% or more of the cells.

It is therefore clear from such tests that after the yeast solution has been held at a given pressure for a sufficient time, the volume of $CO_2$ dissolved is a function of the temperature; the weight of the dissolved gas being dependent upon the pressure.

According to Henry's Law, when the temperature is raised while the pressure remains constant, the amount of gas dissolved is reduced unless the pressure is raised to the point where the weight of gas has the reduced volume that is dissolved at the higher temperature.

In other words, when yeast has been in contact with $CO_2$ at a given temperature and pressure and is then heated before spraying, the pressure necessary to maintain the dissolved gas weight is a function of the weight of $CO_2$ dissolved at the storage temperature and pressure over the weight dissolved at the same pressure at the temperature of the heating coil. This gives the increase of pressure necessary to hold the gas in solution.

For example: If yeast solution is stored for a period of from 48 to 72 hours in contact with $CO_2$ at 10 atmospheres absolute and 0° C., it will absorb 17.13 volumes of $CO_2$. If this solution is then passed through a heating coil and the temperature raised to 40° C. the pressure will have to be raised to above 30 atmospheres absolute to hold the gas in solution until it reaches the spray nozzle.

It can easily be seen for every different storage pressure and temperature and change of heating coil temperature, the spray pressure will vary directly as set forth.

There are certain limitations of pressure, as storage at 20 atmospheres 0° C. will give 34.26 volumes of $CO_2$ which are sufficient to break down any cells. Also at this volume of $CO_2$ the spraying pressure at 40° C. would be above 67 atmospheres.

The temperature limitations are for storage 0° C. and for spraying between 30.96° C. which is the critical temperature for $CO_2$ above which it is always in the gaseous state, to 49° C. which is the highest temperature to which yeast solution may be heated without the danger of destroying any of the vitamins or enzymes present.

Therefore, the object of the first part of this description is to disclose the fact that advantage is to be secured through the storing of yeast at approximately 0° C. with $CO_2$ for prolonged periods of time and that as a result of this storage, penetration of the cell and swelling of the cell is secured because of the acid nature of the carbonic acid solution present. Furthermore, the specific fact of spraying this material into a vacuum has a markedly beneficial effect, as microphotographs of samples given the same treatment in which one sample was removed after 72 hours from the bottom of the storage tank showed, as a result of the hydrolysis and release of pressure, just from the mere fact of taking the sample from the bottom of the tank under pressure, indication of some disintegration and marked evidence of swelling. The second sample that was sprayed from 1500 pounds into atmosphere, gave further evidence of more marked disintegration, and the third sample, sprayed from 1500 pounds into vacuum showed at least 95% alteration, based upon a morphological examination with safranin.

The cracked or altered material is the first step toward recovering the various valuable constituents contained within the cell, and I will now disclose various methods by which concentrates or pure products may be manufactured from this cracked or altered material.

It is well known that yeast, is a very valuable source of vitamin B complexes and the amount of vitamin B present, is controlled by the nutrient solution in which the yeast was raised. Baker's yeast which ordinarily is raised in nutrient solutions deficient in the vitamin complexes, contains but small amounts of these vitamins. On the other hand, brewer's yeast contains large amounts of all of the vitamin B complexes known today. This is due to the fact that malted grain used is very rich in these vitamins and that the yeast has the peculiar property of taking up such vitamins and storing them within the cell to be used in its own metabolism. As a result, beer produced today (that is filtered of all yeast cells) shows no traces of the vitamin complexes. Tests of American brewer's yeast show that it contains 50 to 60 Sherman units of vitamin B—1 per gram and about 50 to 60 international units vitamins B—2 or G per gram. When one compares this vitamin potency, which is approximately 1800 international units per ounce, with wheat germ which contains about 190 international units per ounce, it can be readily seen that brewer's yeast is one of the most valuable sources of raw material for obtaining vitamin B complexes.

Many methods have been proposed for separating the vitamins from brewer's yeast, in all of which endeavors have been made to break down the cell wall so as to release the water soluble vitamin material contained within the cell. There are two main components of these vitamin B complexes, one being thermo-labile and consisting of B—1 or thiamin—B—3 and B—4, and other unknown complexes of this type. These are affected to a considerable extent by heating and particularly by alkalis. Weak acids apparently have no effect. Of the thermo-stable components, there are riboflavin, nicotinic acid, B—6, and other unknown complexes. While these compounds are relatively stable to heat they are affected by alkalis but apparently are stable to weak acids.

At the present time vitamin B—1 or thiamin, vitamin B—2 which is riboflavin, nicotinic acid, B—6, the rat acroydnia factor, have been isolated and synthesized. Investigations have shown the presence of many physiologically active water soluble substances beside these, of which B—3, B—4 and B—5 are specifically known. There are still many other of these B complexes that are known to exist but whose specific action has not yet been determined.

In the treatment of many nutritional vitamin deficiencies it is of advantage to use a vitamin B complex extract that has been concentrated, (so that large dosage is not necessary) in preference to using thiamin or other pure principals unless a diagnosis has been made showing that there has been a lack of one particular vitamin such as in polyneuritis, beri-beri or pellagra.

Therefore, by my process I can alter the permeability of the cell wall of the yeast without the use of heat or chemicals with the exception of a very weak solution of carbonic acid and inasmuch as $CO_2$ is one of the products of the metabolism of the yeast cell, and the B complexes are all stable to weak acids, I can prepare a material from which by water extraction and centrifuge or filtering, the vitamin B complexes can effectively be removed. The concentration is a simple matter and can be carried out by means of reduction to a syrup under vacuum or spray drying into a powder. This material can be used directly as vitamin B complex concentrate for nutritional correction or can be used as a raw stock for subsequent separation through the many well known methods for the manufacture of pure principals. (Another valuable use of this material is that the cracked or altered yeast can be added to the fermenting tanks of brewers or distillers and will very markedly increase the rate of fermentation due to the vitamins present—see page 374, Vitamin B—1, Williams and Spies.)

After the water extraction is completed, the pressed cell debris may be spray dried and sold for food purposes or it may be the basis for the extraction of ergosterol.

To avoid undue dilution of the yeast it is preferably handled in a viscous or plastic condition, and until the cell has been broken down, remains in that state. When such a plastic mass is treated by my process, the fluidity of the product is greatly increased so that it is easier to handle. Previous to the processing, the cell mass of the yeast will stratify or segregate in water solutions whereas after passing through my process, there is no segregation of the solids contained in the solution.

Before concluding, I may state that while I have disclosed specifically the use of $CO_2$, I am aware that certain other gases and compounds may be used in lieu thereof, but so far as I know, they are not as effective as $CO_2$. Consideration must be given to the fact that only the use of a gas that will give the desired reaction in connection with water and that has a relative high solubility would duplicate the conditions secured with the use of $CO_2$. It will therefore be understood that I propose to use in my process any suitable gas capable of affecting the cells to produce the desired result, and which upon heating and discharging from high pressure into a vacuum, will cause the desired rupturing of the cell.

From the foregoing it will be understood that prolonged contact of the aqueous yeast solution with $CO_2$ or its equivalent under pressure is advantageous, as swelling of the cell is caused, and beneficial effects are secured through discharging the treated solution into a vacuum zone. The material produced in this manner is a valuable source of vitamin B complexes, and extracts of the same can be made by using various well-known methods of separation. These crude extracts can be spray dried and used, or they can be the raw material from which the pure active principals can be extracted by well known means. I also recognize the fact that if this cracked or altered yeast or its extracts are added to fermenting yeast, it will accelerate the fermentation rate. I am also aware that these extracts, concentrated or otherwise, can be added to finished malt beverages, such as beer, so that the beverage will contain the various vitamin B complexes to assist in the carbohydrate metabolism. Due to the fact that this treatment alters or disintegrates the yeast cells, the product can be packed in containers and shipped in the liquid state without gas formation such as takes place with ordinary liquid yeast.

Instead of dispersion $CO_2$ or its equivalent alone in the aqueous yeast solution I may dilute the gas with air or oxygen prior to such dispersion.

The invention is capable of various modifications and changes, all of which are comprehended within the scope of the appended claims.

What I claim and desire to secure by Letters Patent is:

1. In a process of the character described, dispersing $CO_2$ in an aqueous yeast solution, main- 1. taining the mixture at subatmospheric temperatures and superatmospheric pressures for a prolonged period of time, then subjecting the mixture to a high superatmospheric pressure and superatmospheric temperature up to approximately 49° C., and finally releasing the pressure and introducing the mixture into a subatmospheric zone where the gas separates from the solution.

2. In a process of the character described, dispersing $CO_2$ in an aqueous yeast solution at a subatmospheric temperature and a superatmospheric pressure, maintaining the mixture at approximately said temperature and pressure for a prolonged period of time, and then subjecting the mixture to a high superatmospheric pressure and superatmospheric temperature up to approximately 49° C., and finally releasing the pressure and introducing the mixture into a subatmospheric zone where the gas separates from the solution.

3. In a process of the character described, dispersing $CO_2$ in an aqueous yeast solution at a pressure of the order of 150 pounds per square inch and at subatmospheric temperature, maintaining the mixture at substantially said temperature and pressure for a prolonged period of time, then subjecting the mixture to a high superatmospheric pressure and superatmospheric temperature up to approximately 49° C., and finally releasing the pressure and introducing the mixture into a subatmospheric zone where the gas separates from the solution.

4. In a process of the character described, dispersing $CO_2$ in an aqueous solution of brewers yeast, then maintaining the mixture at subatmospheric temperatures and superatmospheric pressures for a prolonged period of time, then subjecting the mixture to a high superatmospheric pressure and superatmospheric temperature up to approximately 49° C., and finally releasing the pressure and introducing the mixture into a subatmospheric zone where the gas separates from the solution.

5. In a process of the character described, dispersing $CO_2$ in an aqueous yeast solution at superatmospheric pressure and subatmospheric temperatures, maintaining the mixture at substantially said temperatures and pressures for a prolonged period of time, then subjecting the mixture to superatmospheric temperature from about 30° C. to approximately 49° C. and a pressure above ten atmospheres, and finally releasing the pressure and introducing the mixture into a subatmospheric zone where the gas separates from the solution.

6. In a process of the character described, dispersing $CO_2$ in gaseous condition in an aqueous yeast solution at superatmospheric pressure and subatmospheric temperature, maintaining the mixture substantially at said temperatures and pressures for a number of hours, then subjecting the mixture to a high superatmospheric pressure and superatmospheric temperature, from about 30° C. to approximately 49° C., and finally releasing the pressure and introducing the mixture into a subatmospheric zone where the gas separates from the solution.

7. In a process of the character described, dispersing $CO_2$ in an aqueous yeast solution at superatmospheric pressures and subatmospheric temperatures, maintaining the mixture at such temperatures and pressure for about 48 to 72 hours, then subjecting the mixture to a high superatmospheric pressure and superatmospheric temperature up to approximately 49° C., and finally releasing the pressure and introducing the mixture into a subatmospheric zone where the gas separates from the solution.

8. In a process of the character described, dispersing $CO_2$ in an aqueous yeast solution at superatmospheric pressures and subatmospheric temperatures, maintaining the mixture at substantially said temperatures and pressures for a prolonged period of time, then subjecting the mixture to a pressure ranging between 20 to 70 atmospheres and to superatmospheric temperatures up to approximately 49° C., and finally releasing the pressure and introducing the mixture into a subatmospheric zone where the gas separates from the solution.

9. In a process of the character described, dispersing $CO_2$ in an aqueous solution at superatmospheric pressures and at subatmospheric temperatures, maintaining the mixture at substantially said temperatures and pressures for a prolonged period of time, then subjecting the mixture to a high superatmospheric pressure and a temperature of approximately 30° C. to 49° C., and finally releasing the pressure and introducing the mixture into a subatmospheric zone where the gas separates from the solution.

10. A process of the character described consisting in dispersing $CO_2$ in an aqueous yeast solution at superatmospheric pressures and subatmospheric temperatures, maintaining the mixture at substantially said temperatures and pressures and in the absence of any nutrient for a prolonged period of time, then subjecting the mixture to a high superatmospheric pressure and superatmospheric temperature up to approximately 49° C., and finally releasing the pressure and introducing the mixture into a vacuum zone where the gas separates from the solution.

11. In a process of the character described, dispersing $CO_2$ in an aqueous yeast solution at substatnially 0° C. and at a pressure of approximately ten atmospheres, maintaining the mixture at substantially the same temperatures and pressures for a number of hours, then subjecting the mixture to a high superatmospheric pressure and superatmospheric temperature up to approximately 49° C., and finally releasing the pressure and introducing the mixture into a subatmospheric zone where the gas separates from the solution.

12. In a process of the character described, dispersing $CO_2$ in an aqueous viscous yeast solution, maintaining the mixture at subatmospheric temperatures and superatmospheric pressures for a number of hours, then subjecting the mixture to a high superatmospheric pressure and superatmospheric temperature up to approximately 49° C., and finally releasing the pressure and introducing the mixture into a subatmospheric zone where the gas separates from the solution.

13. A yeast treating process comprising dispersing $CO_2$ in a yeast solution, maintaining the mixture under relatively low superatmospheric pressures for at least a day, then subjecting the mixture to a relatively high superatmospheric pressure and superatmospheric temperature up to approximately 49° C., and finally releasing the pressure and discharging the mixture into a vacuum zone where the gas separates from the solution.

14. In a process of the character described, dispersing $CO_2$ in gaseous condition in an aqueous yeast solution maintaining the mixture at a subatmospheric temperature and a superatmospheric pressure for a prolonged period of time during which the $CO_2$ is in liquid phase, subjecting the mixture at the end of said period to a high superatmospheric pressure and superatmospheric temperature up to approximately 49° C., and finally releasing the pressure and introducing the mixture into a vacuum zone where the gas separates from the solution.

15. In the treatment of yeast, maintaining $CO_2$ in contact with an aqueous yeast solution at subatmospheric temperatures and superatmospheric pressures for a prolonged period of time, then subjecting the mixture to a higher superatmospheric pressure and superatmospheric temperature up to approximately 49° C., and finally releasing the pressure and introducing the mixture into a substantially atmospheric zone where the gas separates from the solution.

WILLIAM P. TORRINGTON.